(12) United States Patent
Osman et al.

(10) Patent No.: US 12,128,302 B2
(45) Date of Patent: Oct. 29, 2024

(54) AWAY FROM KEYBOARD (AFK) HELPER FOR GAME PLAYERS

(71) Applicant: Sony Interactive Entertainment Inc., Tokyo (JP)

(72) Inventors: Steven Osman, San Mateo, CA (US); Olga Rudi, San Mateo, CA (US); Mahdi Azmandian, San Mateo, CA (US); Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 224 days.

(21) Appl. No.: 17/816,969

(22) Filed: Aug. 2, 2022

(65) Prior Publication Data

US 2024/0042314 A1 Feb. 8, 2024

(51) Int. Cl.
*A63F 13/49* (2014.01)

(52) U.S. Cl.
CPC .................. *A63F 13/49* (2014.09)

(58) Field of Classification Search
CPC ........................................ A63F 13/49
See application file for complete search history.

(56) References Cited

U.S. PATENT DOCUMENTS

| | | | |
|---|---|---|---|
| 2008/0318656 A1* | 12/2008 | Walker | G07F 17/3262 463/20 |
| 2018/0256979 A1* | 9/2018 | Kunieda | A63F 13/47 |
| 2018/0256981 A1* | 9/2018 | Enomoto | A63F 13/67 |

* cited by examiner

*Primary Examiner* — Reginald A Renwick
(74) *Attorney, Agent, or Firm* — John L. Rogitz; John M. Rogitz

(57) ABSTRACT

A player who is interrupted during play of a computer simulation such as a computer game and must attend to other matters (colloquially referred to herein as being "away from keyboard" or "AFK") is assisted in three phases. A first type of assistance is rendered when entering AFK, as in, at the start of the interruption. A second type of assistance is rendered during AFK, while the player is away. A third type of assistance is rendered when the player returns from AFK to the computer simulation.

19 Claims, 8 Drawing Sheets

Detection Start of AFK (Phase I)

Phase II AFK Support

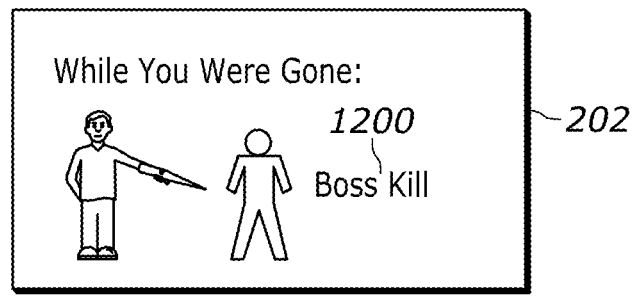
FIG. 12
FIG. 13
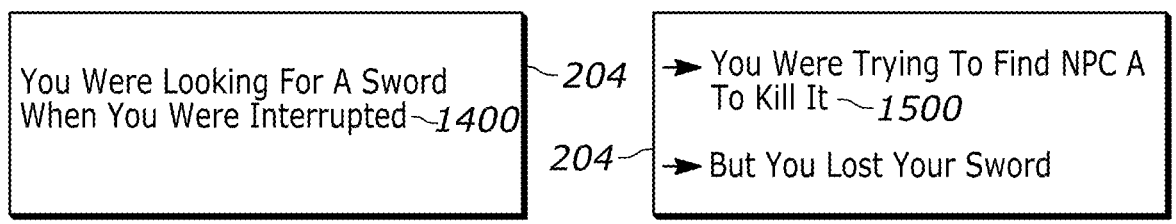
FIG. 14                    FIG. 15

AWAY FROM KEYBOARD (AFK) HELPER FOR GAME PLAYERS

FIELD

The present application relates generally to an AFK helper for computer game players.

BACKGROUND

Players are often interrupted while playing computer simulations such as computer games. This can be a challenge in the case of the interruption happening in an inopportune moment, for example, just as encountering a challenging enemy, or as another example in the midst of a multiplayer game session.

SUMMARY

Present principles propose a broad framework for dealing with interruptions during game play, colloquially referred to herein as the player being "away from keyboard" or "AFK." Present principles consider "AFK-ness" as a three phased issue in which different types of assistance are rendered in each of the three different phases. Phase 1 is entering AFK, as in, at the start of the interruption. Phase 2 is during AFK, while the player is away. Phase 3 is when returning from AFK, as the player returns to the game.

Accordingly, an assembly includes at least one processor configured with instructions to detect that a player of a computer simulation experiences an interruption. Responsive to the start of the interruption, the processor is configured to render a first assistance. The processor is configured to render a second assistance during the interruption, while the player is interrupted, and to render a third assistance when the player returns from the interruption to the computer simulation.

In some implementations the processor can be configured to detect that the player of the computer simulation is interrupted by the interruption at least in part by detecting at least one audio signal. In addition, or alternatively, the processor can be configured to detect that the player of the computer simulation is interrupted by the interruption at least in part by receiving at least one message indicating the interruption. In addition, or alternatively, the processor can be configured to detect that the player of the computer simulation is interrupted by the interruption at least in part by receiving at least one player-generated indication of the interruption. In addition, or alternatively, interruptions can be detected by a camera. For example, when a player is in virtual reality (VR) the front face cameras can image someone else standing right in front of the player, or image a pet that is just in the way of a standing player and might cause an accident if the player is not warned of its presence. Such images may be analyzed using image recognition to identify the obstruction and return an indication of interruption.

In non-limiting examples the processor may be configured to render the first assistance at least in part by presenting a prompt to the player to indicate a relative length of the interruption.

In some embodiments a camera distanced from a player such as a camera mounted by a door can stream video to a game console shown on a display, e.g., a small corner of a TV or HMD. In this way, the player can briefly see who is at the door and if decide if the player wants to be considered AFK or continue with the game if it is nothing urgent or important. For example, some salesperson can be at the door and the player might prefer to continue the game.

In some examples the processor may be configured to render the second assistance at least in part by any one or more of the following:
  sending at least one message to at least one recipient indicating the interruption;
  moving a character associated with the player from a first location in the computer simulation to a second location;
  initiating a save of the simulation;
  playing the simulation on the player's behalf.

On the other hand, non-limiting examples of the third assistance may include one or more of presenting on at least one display a reminder of at least one goal of the player pertaining to the simulation, and playing at least one recap video of what the player was doing in the simulation before the interruption.

In another aspect, a device includes at least one computer storage that is not a transitory signal and that in turn has instructions executable by at least one processor to identify an interruption of a player of a computer game that is not generated by the computer game, and responsive to the interruption, automatically control the computer game.

In some embodiments of this aspect, the instructions can be executable to identify a temporal length of the interruption, and automatically control the computer game based at least in part on the temporal length of the interruption. Thus, the instructions may be executable to identify a first interruption having a first temporal length and to automatically control the computer game at least in part responsive to the first temporal length of the first interruption by inputting to the computer game at least a first command. Then, the instructions ca be executed to identify a second interruption having a second temporal length and automatically control the computer game at least in part responsive to the second temporal length of the second interruption by inputting to the computer game at least a second command different from the first command.

In another aspect, a method includes providing first automatic control related a computer simulation being played by a player responsive to a start of an interruption of the player. The method also includes providing second automatic control related to the computer simulation during the interruption. Further, the method includes providing third automatic control related to the computer simulation responsive to the end of the interruption.

The details of the present application, both as to its structure and operation, can be best understood in reference to the accompanying drawings, in which like reference numerals refer to like parts, and in which:

BRIEF DESCRIPTION OF THE DRAWINGS

FIG. 12 illustrates an example screen shot related to FIG. 11 that may be presented on any display herein;

FIG. 13 illustrates example logic in example flow chart format for third phase assistance;

FIG. 14 illustrates a first example screen shot related to FIG. 13 that may be presented on any display herein;

FIG. 15 illustrates a second example screen shot related to FIG. 13 that may be presented on any display herein;

DETAILED DESCRIPTION

Figure 1:
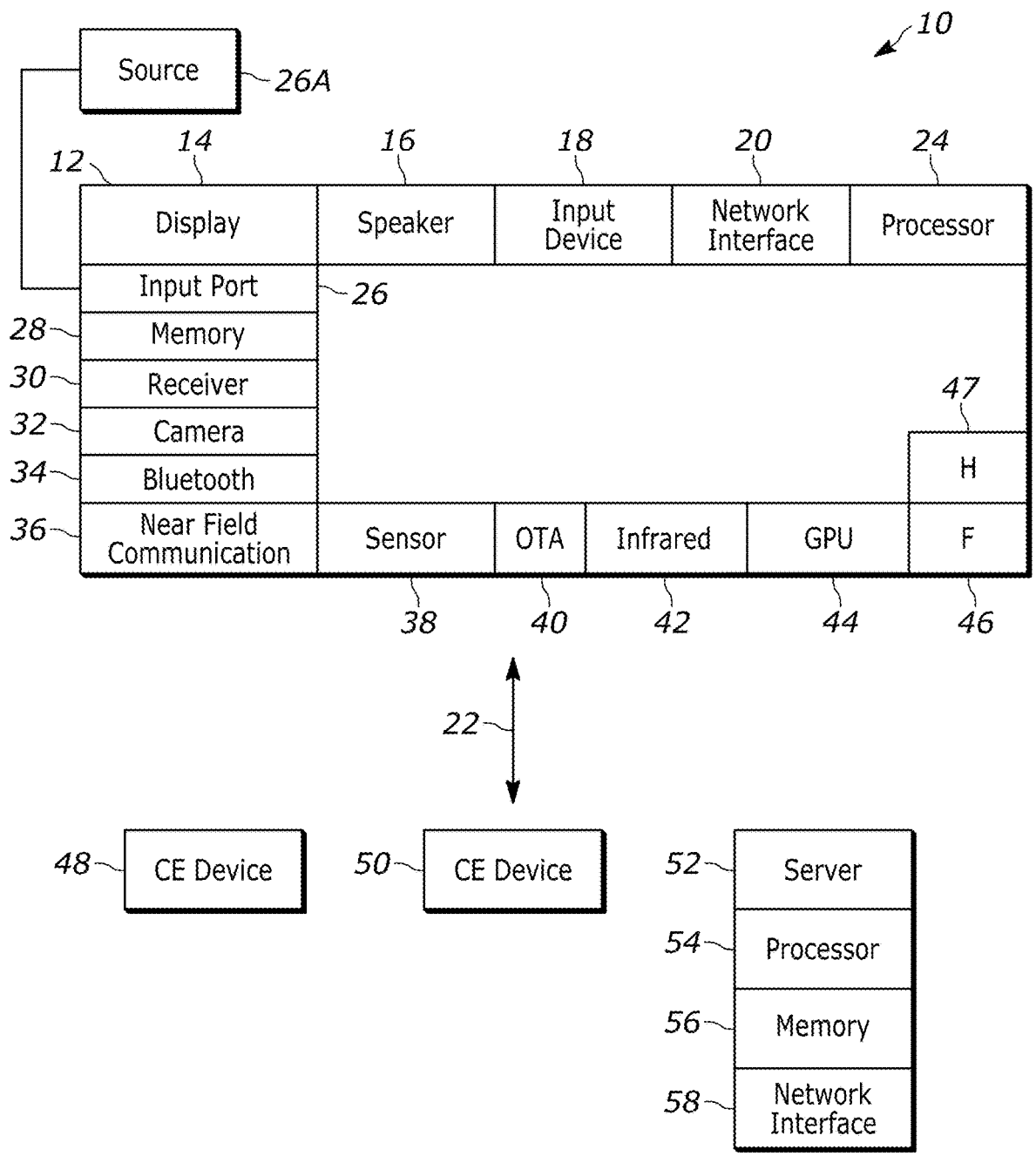
FIG. 1 is a block diagram of an example system in accordance with present principles.

This disclosure relates generally to computer ecosystems including aspects of consumer electronics (CE) device networks such as but not limited to computer game networks. A system herein may include server and client components, which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, a LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth© transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs. The logic shown in flow charts herein may be executed by any one or more of the processors discussed herein.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
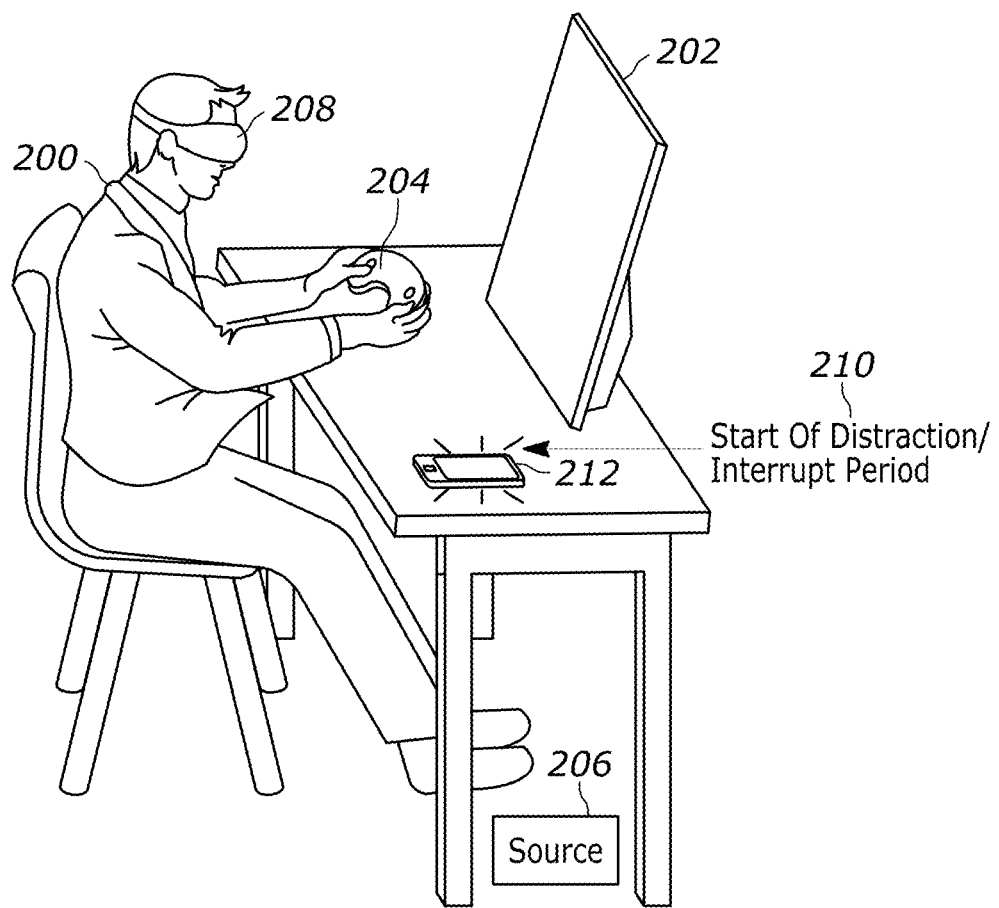
FIG. 2 illustrates a player of a computer simulation such as a computer game during the first phase of an interruption.

FIG. 2 illustrates a player 200 of a computer simulation such as a computer game being presented on a display 202 under control of a computer simulation controller 204 operated by the player 200. The computer simulation may be provided by a source 206 of computer simulations such as a computer game console or streaming game server consistent with commands input by the player 200 on the controller 204. In the non-limiting example shown, the player 200 also is wearing an XR headset 208 which may present the computer simulation in addition to or in lieu of the display 202.

As indicated at 210, FIG. 2 illustrates the player 200 at the start of a distraction period that has been initiated by one or more interruptions external to the computer simulation. By way of illustration, the interruption is the ringing of a mobile phone 212. Other example interruptions are discussed further below.

Figure 3:
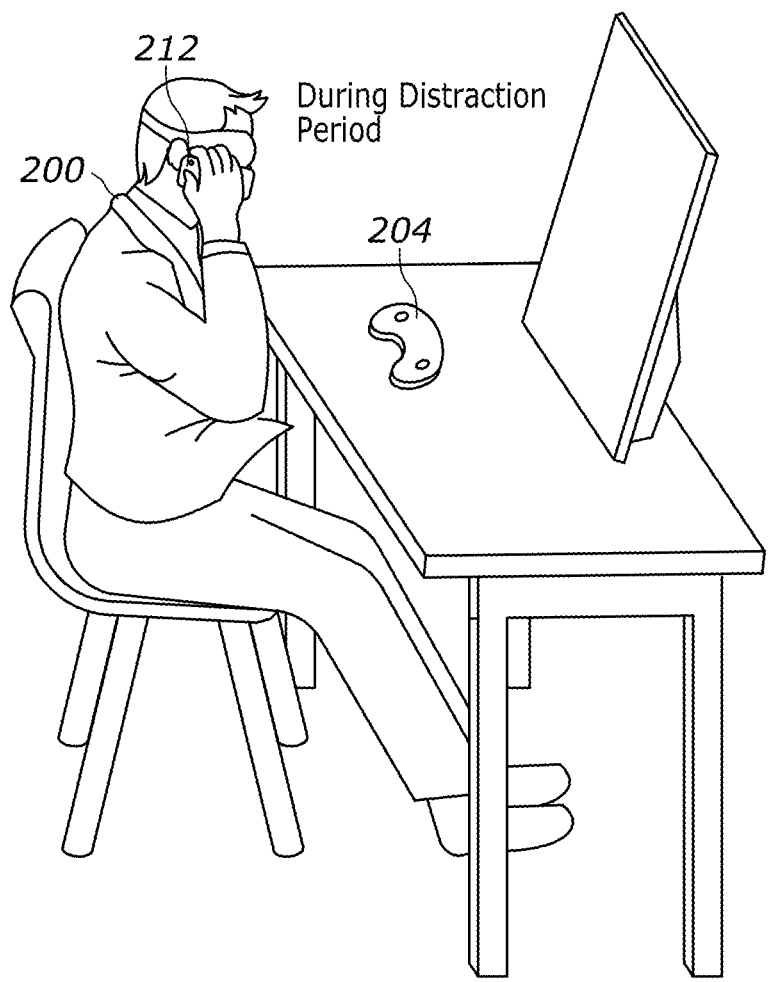
FIG. 3 illustrates the player in an ensuing second phase of the interruption.

FIG. 3 illustrates the player 200 during the interruption. As shown, the player 200 has stopped playing the computer simulation, laying down the controller 204 and picking up the phone 212 to answer the call.

Figure 4:
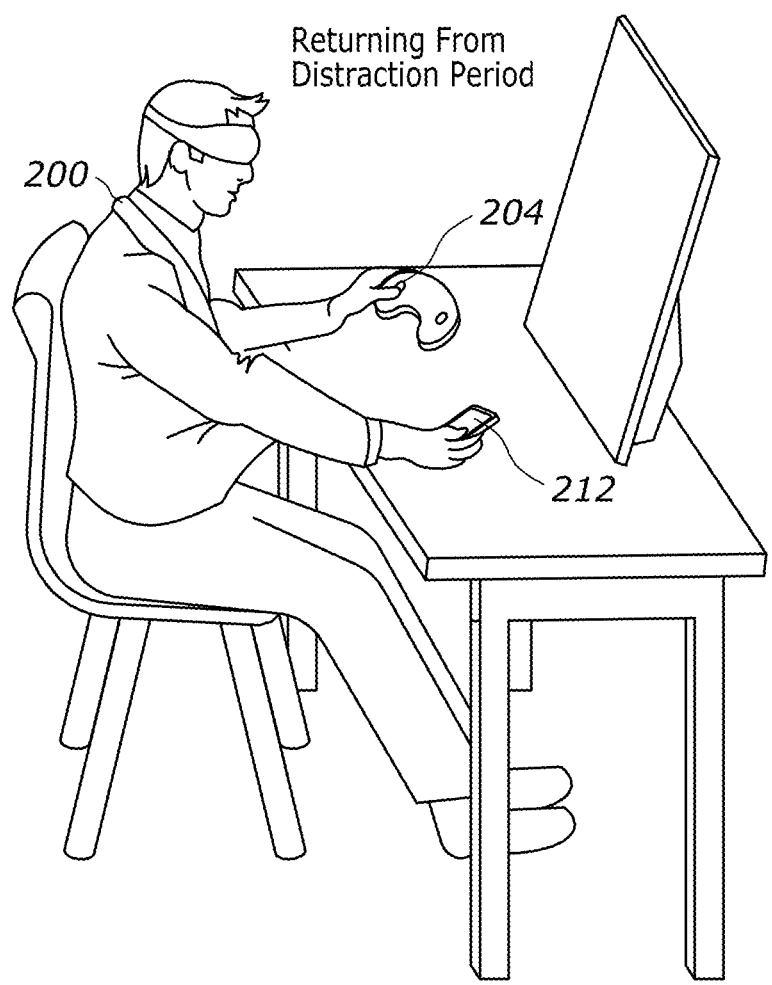
FIG. 4 illustrates the player in the final (third) phase of the interruption.

FIG. 4 illustrates he player 200 returning from the interruption to resume play of the computer simulation. The player 200 has laid down the phone 212 and grasped the controller 204 to resume playing the simulation.

Figure 5:
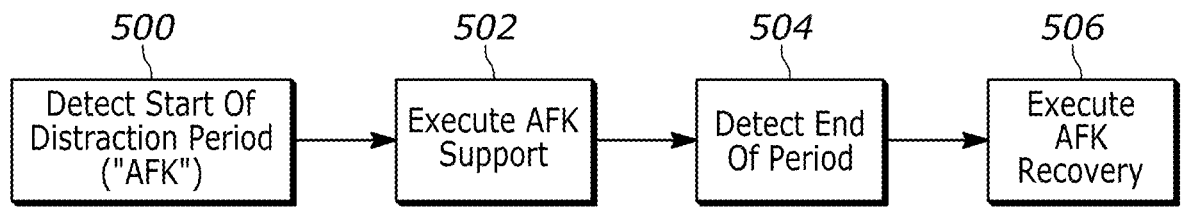
FIG. 5 illustrates example overall logic in example flow chart format.

FIG. 5 illustrates the overall logic of any one or more processors described herein executing a computer program, referred to herein as an away-from-keyboard (AFK) helper, consistent with the three phases of interruption illustrated in FIGS. 2-4. While the term "AFK" is used for shorthand, it is to be understood that in example embodiments the AFK helper provides assistance to the player during interruptions in playing computer simulations which may not use keyboards per se in the three interrupt phases illustrated in FIGS. 2-4.

Commencing at block 500, the start of a distraction period ("AFK") is detected. AFK support is executed at block 502 during the interruption. The end of the distraction period is detected at block 504, and AFK recovery support is executed at block 506. These blocks are described in greater detail below.

The AFK helper can be integrated into the system software with hooks into games customized by game developers, offering a consistent, platform-wide experience that makes sense for any given game.

Figure 6:
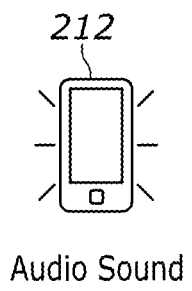
FIG. 6 illustrates a first technique for detecting an interruption.
Figure 7:
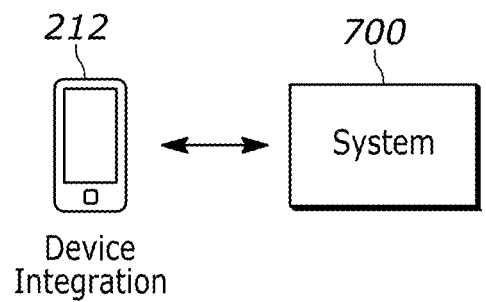
FIG. 7 illustrates a second technique for detecting an interruption.
Figure 8:
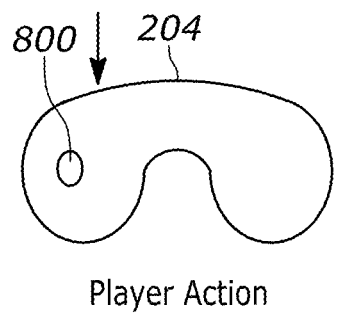
FIG. 8 illustrates a third technique for detecting an interruption.

FIGS. 6-8 illustrate example techniques for detecting the start of a distraction period characterized by an interruption during play of a computer simulation. The AFK helper can detect "entering" AFK through a number of means. For instance, audio signals received through a microphone on the controller 204 or other device may trigger the start of a distraction period. Without limitation, such triggering audio signals may include the sound of the cell phone 212 ringing (FIG. 6), a baby crying, a doorbell ringing, sounds of an accident such as glass being shattered, etc. Such sounds may be classified by one more ML models trained on data including audio signals along with ground truth tags of the audio signals.

Additionally, a distraction period may be identified by automatically tracking timers that have been set in the location. The timers may be detected by detecting sounds emitted from the timers and/or by communicatively coupling the timers with the AFK system such that information from the timers is communicated via IP for example to the AFK system. Examples include tracking an appliance tracker such as an oven timer or a laundry timer. Based on the timer indicating that attention is required, the game can be paused and the user alerted audibly, visually, or tactilely to check the relevant appliance. Messages may be sent to other players indicating an expected away time for the user to check the appliance.

Depending on the type of sound classified, the duration of the distraction period may be initially estimated. The ringing of a doorbell may be interpreted to mean a short distraction period. The sound of a car starting may be interpreted to mean a medium length period, whereas the sound of an emergency such as glass shattering may be interpreted to mean a long distraction period. Support may be rendered for a short distraction period merely by pausing game play, for example, at the detection of a phone ringing or doorbell sounding.

Or, a short distraction period always may be assumed, but if the player does not resume manipulating the controller within a short period, e.g., thirty seconds, a longer distraction period may be assumed.

FIG. 7 illustrates that another technique for detecting a distraction period caused by an interruption to simulation play may be by device integration, such as integration of a system 700 such as the computer simulation system with a cell phone 212 or other and video chat system, integration with an Internet of Things (IoT) device such as a doorbell, integration with an alarm/reminder triggered by a home assistant, etc.

FIG. 8 illustrates that another technique for detecting a distraction period caused by an interruption to simulation play may be by player action, for instance, pressing a button 800 such as a special purpose "AFK" button on the controller 204. Another example may be a triple press of a conventional button if no dedicated button exists. A voice command from the user that the user is stepping away may also be used.

In addition, a distraction period may be identified by lack of motion of a controller for a period, e.g., five to ten seconds, as indicated by signals form motion sensors in the controller indicating that the user has laid the controller down and is no longer manipulating it.

Figure 9:
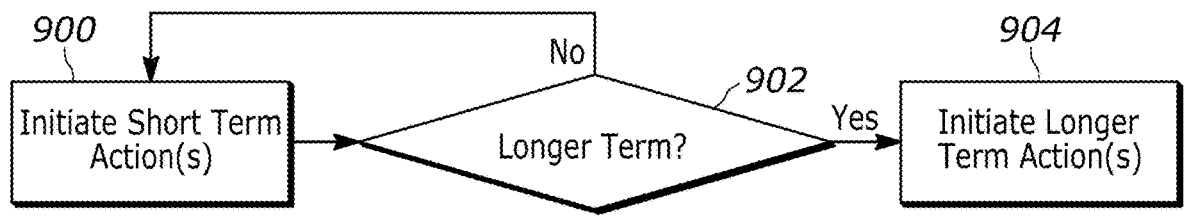
FIG. 9 illustrates example logic in example flow chart format for determining whether the interruption is relative short term or long term.

FIG. 9 illustrates that support rendered to the player during the distraction period may change the longer the distraction period is. Commencing at block 900, at or near the start of the distraction period short term actions may be initiated. Such short-term actions may be to pause the simulation for the player 200 only, or for all players in a multi-player game, or transmission of a message to other players in the game that the player 200 will be absent only a short time, as but a few examples.

Figure 10:
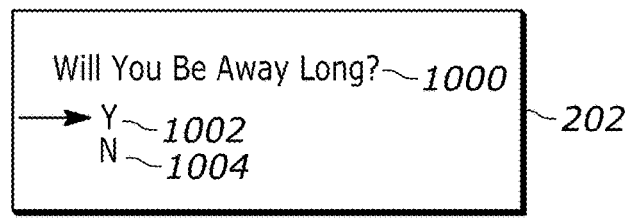
FIG. 10 illustrates an example screen shot related to FIG. 9 that may be presented on any display herein.

In the example above in which the distraction period is initially assumed to be short until a certain short term period such as thirty second has elapsed, as the thirty second mark (in one example) approaches, FIG. 10 illustrates at 1000 that the AFK helper can prompt the player, "will you be gone long?" using an audible or visual message, e.g., on the display 202. Responding "yes" 1002 or failure to respond within a threshold period can be interpreted as indicated at state 902 in FIG. 9 that the distraction period will be longer, and that additional AFK support will be required as indicated at state 904 in FIG. 9. If the answer in the example above is NO 1004, the AFK helper continues with short-term AFK actions.

As mentioned above, certain triggers may automatically cause the AFK helper to assume one of the distraction length modes. For instance, glass being shattered might automatically be assumed to be a long AFK so as not to cause additional stress to the player through additional prompts.

Figure 11:
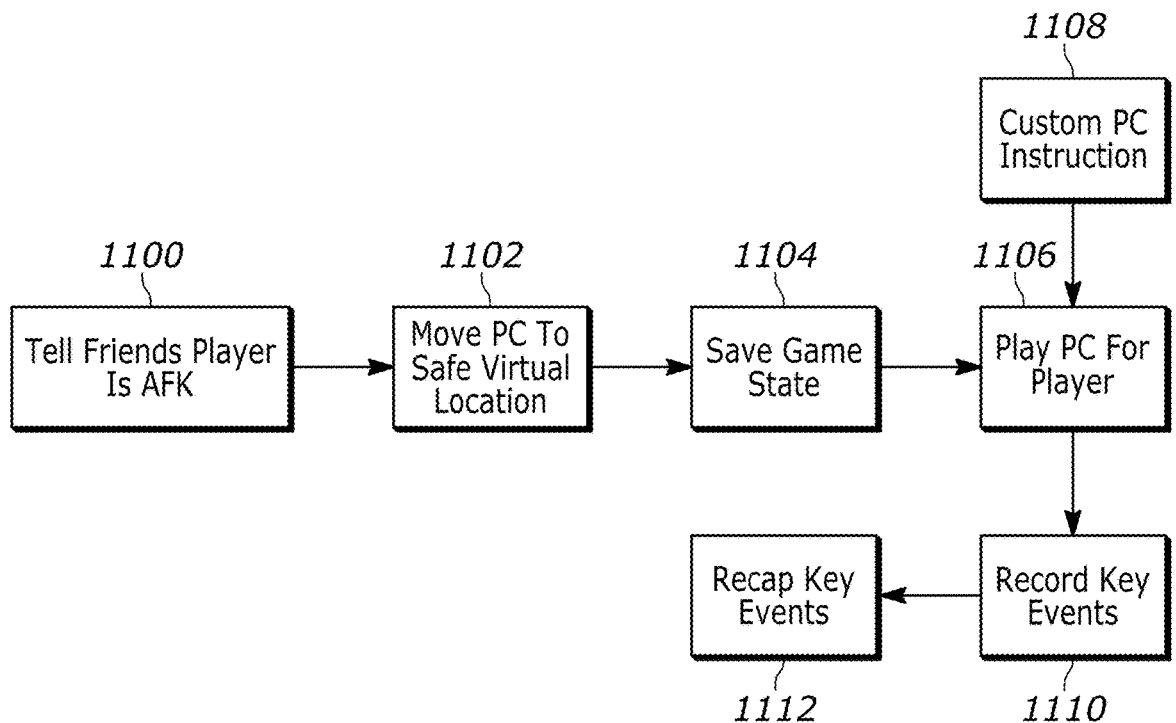
FIG. 11 illustrates example logic in example flow chart format for second phase assistance.

FIG. 11 illustrates example assistance that may be rendered to the player 200 by the AFK helper. One or more of the examples shown in FIG. 11 may be rendered at or just following initial detection of the interruption (short term), and one or more of the examples shown in FIG. 11 may be rendered during a longer-term interruption.

Block 1100 indicates that the AFK helper may send messages to friends or fellow competitors of the player 200 that the player 200 is temporarily away, with an indication of whether it is a short or long time. Block 1102 indicates that the character in the computer simulation that is associated with the player 200 (player character or "PC") may be moved within the virtual space of the simulation to a safe location in the virtual space, such as a cave or another planet. Or, the PC may remain in its virtual location but be made invisible to other game objects, or be made immortal to blows from weapons by, e.g., establishing an impenetrable force field around the PC, such that the PC cannot be killed while the player is away.

Block 1104 indicates that a game save may be initiated particularly if a long distraction period is anticipated. Also, block 1106 indicates that for longer term distraction periods a ML-based agent may input play commands on the player's behalf. This may be done according to customization from state 1108, for instance, with the player 200 creating a macro for what behaviors to perform under certain AFK triggers. Or, a ML model trained on player preferences may execute the play at block 1106 for the player 200. If desired, during the distraction period the controller 202 may be disabled to prevent inadvertent signals being input by a pet or child while the player is distracted.

Moving to block 1110, key events in the computer simulation may be recorded. In the context of computer games these may include crux events of game play such as boss kills. Crux events also may include what other players of the game unlocked while the player 200 was interrupted, how the PC died while the player 200 was interrupted, etc. The key events also may include time-based attention (where a competitor was focused in the simulation) and sentiment (what the emotions were of competitors during play in the distraction period). The recorded game events may be used at block 1112 to generate a recap of the simulation for presentation to the player 200 when he or she returns.

Upon returning from the distraction period caused by an interruption, the AFK helper can offer some services to help bring the player 200 back online. Based on the duration of the distraction period, the helper may know how much the player 200 needs to catch up on.

FIG. 12 illustrates that for a short-term absence, a reminder 1200 may be presented audibly or visually, for example on the display 200 shown in FIGS. 2-4, of the short-term goals of the player 200. In the example shown, the short-term goal of the player 200 was to kill a boss character in the simulation as evinced by the conduct of the PC just prior to the interruption.

FIG. 13 illustrates that more generally, when the distraction period has ended the AFK helper may determine at block 1300 a length of the distraction period, and based on that more to block 1302 to present a recap of the events of the computer simulation that transpired prior to and/or during the distraction period based on the length of the period. The simulation may be restarted at the point the recap video ends, perhaps with a merging effect such as slowing down the speed of a race car in a race simulation for a few seconds until the player 200 has had a chance to collect himself Such slowing down of simulation play overall or only of certain objects in the simulation may be implemented during the distraction period as well.

Phase II actions such as one or more of those illustrated in FIG. 11 may be reversed during phase II at block 1304, for example, notifying friends of the player 200 that the player 200 has returned to play, indicating on a minimap where the PC was located before being moved to safety, etc.

For a mid-term absence a reminder of where the PC was along a quest line/quest chain and additional context may be presented. For a long-term absence (e.g., returning the next day) a recap video may be played automatically upon the player 200 taking up the controller or otherwise indicating a return to play of what the PC was doing shortly before becoming distracted by an interruption as well as what happened in the computer simulation while the player 200 was away.

Figure 16:
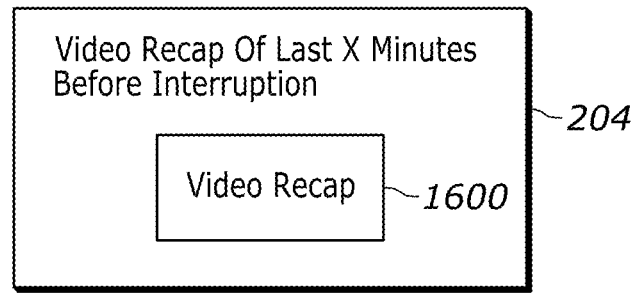
FIG. 16 illustrates a third example screen shot related to FIG. 13 that may be presented on any display herein.

FIGS. 14-17 illustrate the principles of FIG. 13 in further examples. In FIG. 14 a message 1400 is presented that the PC was looking for a weapon prior to being interrupted. In FIG. 15 is message 1500 is presented that the PC was looking for a non-player character (NPC) to kill the NPC but that the PC had lost its weapon prior to being interrupted. In FIG. 16 a video recap 1600 is presented of the last "X" minutes of the simulation prior to being interrupted. Or, the video recap 1600 may be a recap of simulation events generated at block 1112 in FIG. 11 and presented at block 1302 in FIG. 13.

In presenting a recap of events just prior to the interruption, a brief rewind of the recap video may be effected to account for, e.g., the PC about to be killed, and an immediate continuation of the simulation springing this unfortunate event on the player before the player has had a chance to "get up to speed" in play. Additionally, further actions to seamlessly transition the player 200 back to player control may be taken. As an example, the AFK helper may insist, though onscreen instructions or audible instructions, for example, that the player 200 return key poses and controller pose to the pose these elements were in at the start of the interruption.

Figure 17:
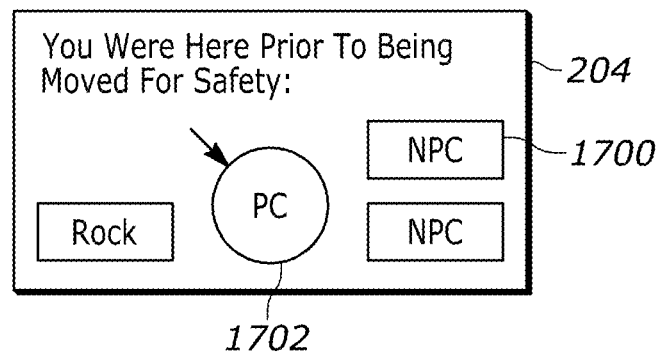
FIG. 17 illustrates a fourth example screen shot related to FIG. 13 that may be presented on any display herein.

FIG. 17 illustrates, as alluded to above, that upon return from AFK a minimap 1700 may be presented indicating where the PC 1702 was located before being moved to safety.

While the particular embodiments are herein shown and described in detail, it is to be understood that the subject matter which is encompassed by the present invention is limited only by the claims.

What is claimed is:

1. An assembly, comprising:
   at least one processor configured with instructions to:
   detect an interruption during play of a computer simulation;
   responsive to the interruption, render a first assistance responsive to a start of the interruption;
   render a second assistance during the interruption; and
   render a third assistance responsive to a player returning to the computer simulation at least in part by presenting on at least one display a reminder of at least one goal of the player pertaining to the simulation.

2. The assembly of claim 1, wherein the processor is configured to detect that the player of the computer simulation is interrupted by the interruption at least in part by detecting at least one audio signal.

3. The assembly of claim 1, wherein the processor is configured to detect that the player of the computer simulation is interrupted by the interruption at least in part by at least one image from at least one camera.

4. The assembly of claim 1, wherein the processor is configured to detect that the player of the computer simulation is interrupted by the interruption at least in part by receiving at least one message indicating the interruption.

5. The assembly of claim 1, wherein the processor is configured to detect that the player of the computer simulation is interrupted by the interruption at least in part by receiving at least one player-generated indication of the interruption.

6. The assembly of claim 1, wherein the processor is configured to render the first assistance at least in part by presenting a prompt to the player to indicate a relative length of the interruption.

7. The assembly of claim 1, wherein the processor is configured to render the second assistance at least in part by sending at least one message to at least one recipient indicating the interruption.

8. The assembly of claim 1, wherein the processor is configured to render the second assistance at least in part by moving a character associated with the player from a first location in the computer simulation to a second location.

9. The assembly of claim 1, wherein the processor is configured to render the second assistance at least in part by initiating a save of the simulation.

10. The assembly of claim 1, wherein the processor is configured to render the second assistance at least in part by playing the simulation on the player's behalf.

11. The assembly of claim 1, wherein the processor is configured to render the third assistance at least in part by playing at least one recap video of what the player was doing in the simulation before the interruption.

12. A device, comprising:
    at least one computer storage that is not a transitory signal and that comprises instructions executable by at least one processor to:
    identify an interruption of a computer game; and
    responsive to the interruption, automatically control the computer game at least in part by moving a player character (PC) within the virtual space of the game to a safe location in the virtual space, and/or making the PC invisible to at least one other game object, and/or making the PC immortal in the game world.

13. The device of claim 12, wherein the instructions are executable to:
    identify a temporal length of the interruption; and
    automatically control the computer game based at least in part on the temporal length of the interruption.

14. The device of claim 13, wherein the instructions are executable to:
    identify a first interruption having a first temporal length;
    automatically control the computer game at least in part responsive to the first temporal length of the first interruption by inputting to the computer game at least a first command;
    identify a second interruption having a second temporal length; and
    automatically control the computer game at least in part responsive to the second temporal length of the second interruption by inputting to the computer game at least a second command different from the first command.

15. A method comprising:
    providing first control related a computer simulation comprising at least one player character and being played by a player, the first control being responsive to a start of an interruption;
    providing second control related to the computer simulation during the interruption; and
    providing third control related to the computer simulation responsive to the end of the interruption, the third control comprising presenting a first recap of events of the computer simulation that transpired prior to and/or during the interruption responsive to the interruption having a first length and presenting a second recap of events of the computer simulation that transpired prior to and/or during the interruption responsive to the interruption having a second length.

16. The method of claim 15, wherein the first control comprises presenting a prompt to the player to indicate a length of the interruption.

17. The method of claim 15, wherein the second control comprises sending at least one message to at least one recipient indicating the interruption.

18. The method of claim 15, wherein the second control comprises moving a character associated with the player from a first location in the computer simulation to a second location.

19. The method of claim 15, wherein the second control comprises playing the simulation on the player's behalf.

* * * * *